United States Patent
Cheng

(10) Patent No.: US 7,375,995 B1
(45) Date of Patent: May 20, 2008

(54) POWER FACTOR CORRECTION CIRCUIT

(75) Inventor: Allen Cheng, Taoyuan Hsien (TW)

(73) Assignee: SPI Electronic Co., Ltd., Taoyuan, Taoyuan Hsien (TW)

( * ) Notice: Subject to any disclaimer, the term of this patent is extended or adjusted under 35 U.S.C. 154(b) by 0 days.

(21) Appl. No.: 11/700,879

(22) Filed: Feb. 1, 2007

(51) Int. Cl.
*H02M 3/24* (2006.01)

(52) U.S. Cl. .............................. 363/97; 363/18; 363/20

(58) Field of Classification Search ................ 363/16, 363/18–21.02, 21.04, 21.12, 37, 97, 131
See application file for complete search history.

(56) References Cited

U.S. PATENT DOCUMENTS 4,969,077 A * 11/1990 Plagge ....................... 363/19
5,852,550 A * 12/1998 Majid et al. ............. 363/21.05
5,995,387 A * 11/1999 Takahashi et al. ....... 363/21.04
7,106,602 B2 * 9/2006 Mabanta et al. ............. 363/18

* cited by examiner

*Primary Examiner*—Jessica Han
(74) *Attorney, Agent, or Firm*—Muncy, Geissler, Olds & Lowe, PLLC

(57) ABSTRACT

A power factor correction circuit used for regulating the phase of a DC current outputted from a rectifier unit in a power supply includes an energy inductor, an output diode, a switch unit, a pulse width modulation unit, a sensing resistor, and a converter transformer. The converter transformer utilizes the DC current outputted from the rectifier unit to generate an induced current, which will pass through the two ends of the sensing resistor to produce a reference voltage, thereby the pulse width modulation unit can produce the duty cycle for the switch unit according to the reference voltage, so that the switch unit can regulate the phase of the DC current through controlling the flowing direction of the DC current.

8 Claims, 2 Drawing Sheets

POWER FACTOR CORRECTION CIRCUIT

FIELD OF THE INVENTION

The present invention is related to a PFC (Power Factor Correction) circuit which utilizes a transformer and a resistor to acquire the reference voltage required by a PWM (Pulse Width Modulation) unit so as to reduce the power consumption.

BACKGROUND OF THE INVENTION

Nowadays, power suppliers have been commonly applied to various electronic products, and owing to the developed technology, the output power thereof is gradually increased. However, for further raising the power, it has to increase the operation efficiency. Generally, the efficiency of power supply is referenced to a power factor, which represents the relationship between the effective power and sum power consumption (apparent power), that is, the rate of effective power to sum power consumption, so that the closer the effective power to the sum power consumption, the higher the power factor, namely, the better the operation efficiency. Therefore, the improvement of operation efficiency can achieve the advantages of real output power increment, consumption reduction and waste heat decrement. And, also because the safe regulation and the harmonic wave regulation issued by European Union request a high standard of the power consumption efficiency for all electronic products, all manufacturers are devoted to improving the operation efficiency of products. Currently, the power supply industry commonly utilizes a PFC (Power Factor Correction) circuit to increase the power factor, and in particular, an active PFC circuit can increase the operation efficiency up to 80%. The working theory of the active PFC circuit is that the phase of an input voltage is detected, and a semiconductor switch unit (generally, a MOSFERT) and a PWM (Pulse Width Modulation) unit are utilized to control and regulate the phase of current to be more closer to the phase of the voltage, so as to increase the real power. The conventional circuit is shown in FIG. 1, after passing through a rectifier unit 1 and a primary filter unit 2, the inputted AC power is transformed into a DC power, which is then transmitted a back end power output unit 3. And, between the filter unit 2 and the power output unit 3, a PFC circuit is disposed which includes a switch unit 4, an energy storage inductor 8, an output diode 9, a sensing resistor 5 and a PWM unit 6. Through the switch unit 4 regulating the phase of the DC current outputted by the rectifier unit 1, the PWM unit 6 can generate the duty cycle for the switch unit 4, and then, the PWM unit 6 utilizes a reference voltage to generate the conductive cycle for the switch unit 4. Conventionally, the method to obtain the reference voltage is to series connect the sensing resistor 5 with the switch unit 4, so that the sensing resistor can generate a reference voltage when the DC current passes therethrough, thereby the PWM unit 6 can adjust the phase of the DC current. However, since the output power of the power supply is gradually increased and also the outputted DC current, the consumption of the sensing resistor 5 in the conventional PFC circuit will become higher, too. The equation for calculating the power is as followed:

$$P = I^2 \times R$$

For making the PWM unit 6 to identify the reference voltages at two ends of the sensing resistor 5, one method is to utilize a PWM unit having a higher sensitivity. However, this may increase the cost of the PWM unit. Alternatively, a larger sensing resistor 5 can be used, so that the reference voltages generated at two ends thereof can be big enough to be correctly detected by the PWM unit 6. But, this method causes the consumption of the PFC circuit which nevertheless causes the product fail in safe regulations. Consequently, a method with reasonable cost and low consumption should be needed.

SUMMARY OF THE INVENTION

In view of the problems described above, the object of the present invention is to provide a circuit whose power factor can be corrected for reducing the consumption so as to conform to the safe regulations and improve the operation efficiency.

The present invention provides a power factor correction (PFC) circuit. The PFC circuit includes an energy storage inductor, an output diode, a pulse width modulation unit, a switch unit and a converter transformer, which is formed by a primary and a secondary windings wound on a magnetic material. The PFC circuit is connected between a rectifier unit and a main transformer at the front end of a power output unit, so that the DC current outputted by the rectifier unit can pass through the converter transformer of the PFC circuit for producing an induced current, which is reduced in proportion to the DC current passing through the primary winding, at the secondary winding. Furthermore, a sensing resistor is disposed to cross the secondary winding for obtaining a reference voltage, and the reference voltage is supplied to the PWM unit for producing the duty cycle of the switch unit, so that the switch unit can regulate the phase of the DC current to be close to the phase of the DC voltage.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DESCRIPTION OF THE PREFERRED EMBODIMENT

Figure 1:
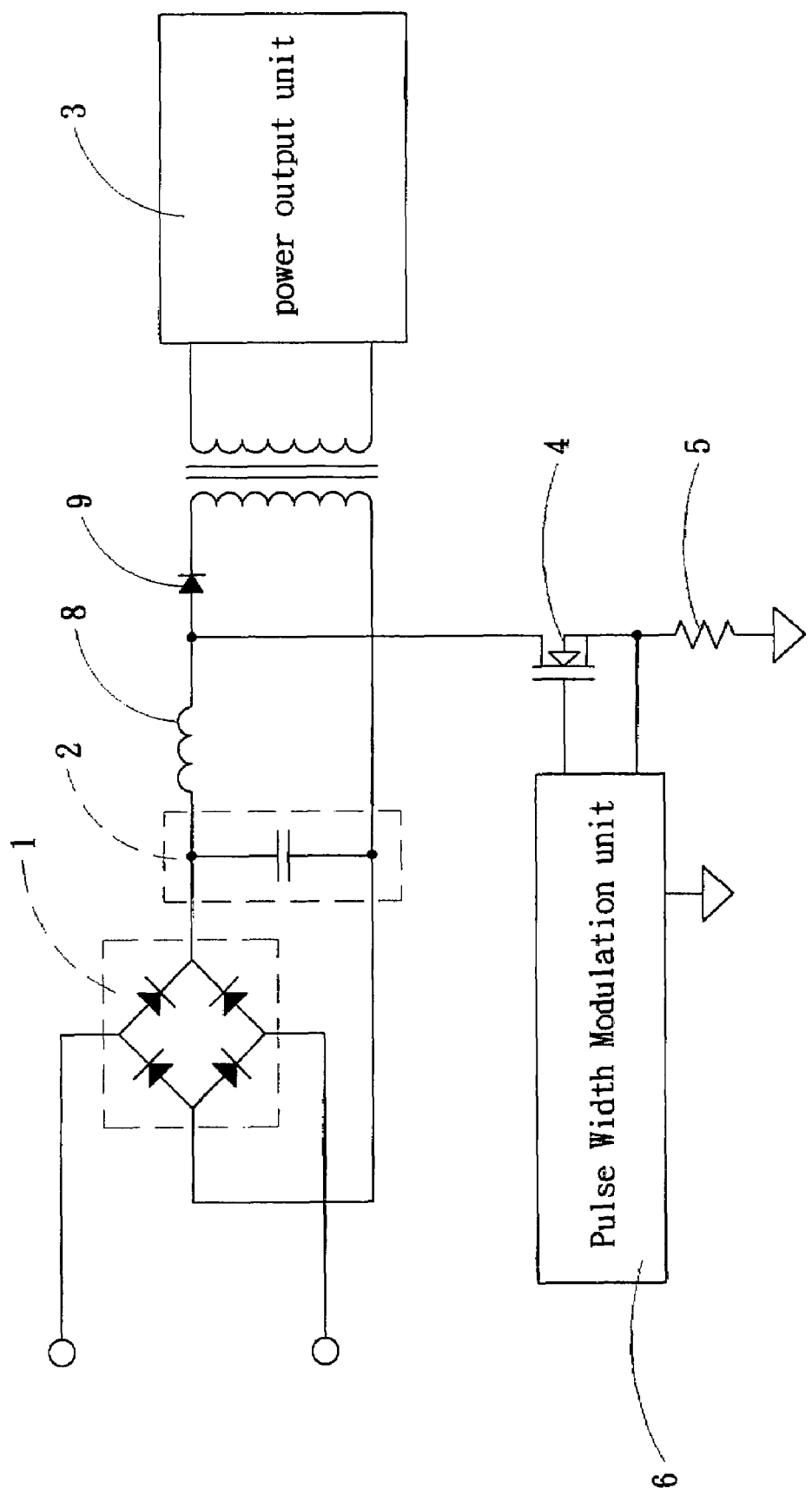
FIG. 1 is a block diagram showing the conventional power supplier.
Figure 2:
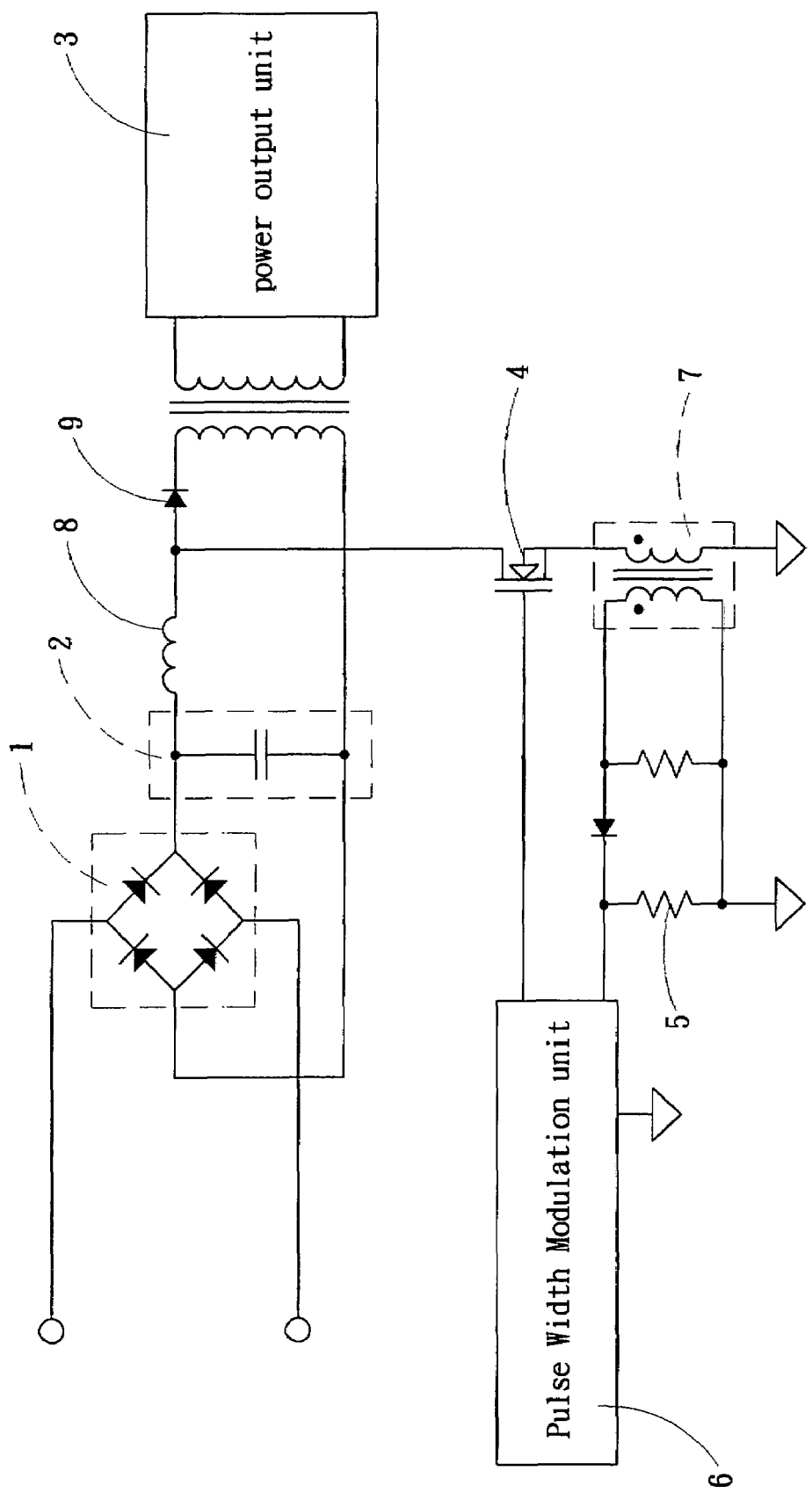
FIG. 2 is a block diagram showing the preferred embodiment according to the present invention.

Please refer to FIG. 2 which shows a preferred embodiment according to the present invention. The present invention is applied to the PFC (Power Factor Correction) circuit in a power supplier. The PFC circuit is connected between a rectifier unit 1 and a main transformer at the front end of a power output unit 3. The power supplier has a rectifier unit 1 for transforming an AC power into a DC power and a power output unit 3 for outputting DC power, and further, between the rectifier unit 1 and the power output unit 3, a filter unit 2 is positioned. As to the PFC circuit according to the present invention, it is parallel connected between the rectifier unit 1 and the power output unit 3. The PFC circuit includes an energy storage inductor 8, an output diode 9, a switch unit 4, a PWM (Pulse Width Modulation) unit 6, a sensing resistor 5 and a converter transformer 7, which is formed by winding a primary and a secondary windings on a magnetic material, wherein the DC current outputted by the rectifier unit 1 will pass through the power output unit 3 when the switch unit 4 is opened, and when the switch unit 4 is closed, the DC current will pass therethrough and the energy will be stored in the energy storage inductor 8. Therefore, through the open or close of the switch unit 4, a current waveform close to the phase of the voltage can be formed. Moreover, the duty cycle of the switch unit 4 is controlled by the PWM unit 6, wherein the duty cycle of the switch unit 4 is generated by the PWM unit 6 comparing the DC voltage outputted by the rectifier unit 1 with a reference voltage, and the reference voltage is produced from the DC current passing through the switch unit 4. Furthermore, the primary winding of the converter transformer 7 is series connected with the switch unit 4, so that when the switch unit 4 is conducted, the DC current will pass through the primary winding of the converter transformer 7, and an induced current will be produced at the secondary winding of the converter transformer 7. The two ends of the secondary winding of the converter transformer 7 are crossed the sensing resistor 5 so as to produce a potential difference between the two ends of the sensing resistor 5 for being the reference voltage for the PWM unit 6. The circle number of the secondary winding of the converter transformer is larger than that of the primary winding, so that the DC current and the induced current are in inverse proportion to the circle numbers of the primary and the secondary windings, that is, if the circle number is fixed, the more the circle number of the secondary winding, the smaller the induced current. Therefore, the induced current is far smaller than the DC current. According to Ohm's low:

$$V = I \times R$$

It knows that the magnitudes of the reference voltages at two sides of the sensing resistor 5 are decided by the induced current and the sensing resistor 5, so that a proper sensing resistor 5 means a suitable reference voltage provided by the PWM unit 6, and also because the induced current is far smaller than the DC current, the power consumption of the sensing resistor 5 can be significantly reduced. If the ratio of the circle numbers of the primary winding to the secondary winding is 1:10, then the power consumption of the sensing resistor 5 can be reduced to 1% of the conventional situation, so that a PFC circuit with an ultra low consumption can be formed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power factor correction (PFC) circuit used in a power supply, which comprises a rectifier unit and a power output unit, wherein the PFC circuit is connected at the back end of the rectifier unit for regulating the phase of a DC current at the back end of the rectifier unit, the PFC circuit comprising:
   an energy storage inductor, for receiving the rectified DC current and storing energy and discharging;
   an output diode, electrically connected between the energy storage inductor and the power output unit;
   a switch unit, parallel connected at the back end of the rectifier unit;
   a magnetic material;
   a primary winding, series connected with the switch unit and wound on the magnetic material;
   a secondary winding, wound on the magnetic material, wherein when the DC current passes through the primary winding, the secondary winding produces an induced current;
   a sensing resistor, crossed at two ends of the secondary winding for producing a reference voltage when the induced current from the secondary winding passes through the two ends of the sensing resistor; and
   a pulse width modulation (PWM) unit, for producing a duty cycle for the switch unit according to the reference voltage so as to regulate the phase of the DC current.

2. The power factor correction circuit as claimed in claim 1, wherein the rectifier unit transforms an inputted AC power into the DC power.

3. The power factor correction circuit as claimed in claim 1, wherein a main transformer is further included between the power output unit and the output diode.

4. The power factor correction circuit as claimed in claim 1, wherein when the switch unit is closed, the DC current passes through the switch unit, and when the switch unit is opened, the DC current passes through the power output unit.

5. The power factor correction circuit as claimed in claim 1, wherein when the switch unit is closed, the energy of the DC current is stored in the energy storage inductor.

6. The power factor correction circuit as claimed in claim 1, wherein the magnitudes of the DC current and the induced current are in inverse proportion to the circle numbers of the primary winding and the secondary winding.

7. The power factor correction circuit as claimed in claim 1, wherein the circle number of the secondary winding is larger than that of the primary winding, so that the induced current from the secondary winding is smaller than the DC current passing through the primary winding.

8. The power factor correction circuit as claimed in claim 1, wherein the reference voltage is the potential difference produced by the induced current passing through the sensing resistor.

\* \* \* \* \*